United States Patent [19]

Hinney et al.

[11] Patent Number: 4,658,062

[45] Date of Patent: Apr. 14, 1987

[54] AMINE TERMINATED POLYBUTADIENE COMPOSITIONS AND PREPARATION THEREOF

[75] Inventors: Harry R. Hinney, Springfield; Jamil Baghdadchi, Wayne, both of Pa.

[73] Assignee: Atlantic Richfield Company, Los Angeles, Calif.

[21] Appl. No.: 748,068

[22] Filed: Jun. 24, 1985

[51] Int. Cl.⁴ .............................................. C07C 87/50
[52] U.S. Cl. .................................... 564/305; 564/372; 564/393; 564/445; 564/457; 564/462; 564/468; 564/509
[58] Field of Search ............... 564/305, 393, 445, 457, 564/462, 468, 509, 372

[56] References Cited

FOREIGN PATENT DOCUMENTS 50-24381 3/1975 Japan .

OTHER PUBLICATIONS

Sekera, V. C. & Marvel, G. S., "Higher Alkyl Sulfonates" in J. Am. Chem. Soc., vol. 55, pp. 345–349 (1933).

Primary Examiner—Anton H. Sutto
Assistant Examiner—John A. Sopp
Attorney, Agent, or Firm—Delbert E. McCaslin

[57] ABSTRACT

Novel amine terminated polybutadiene compounds of the formula:

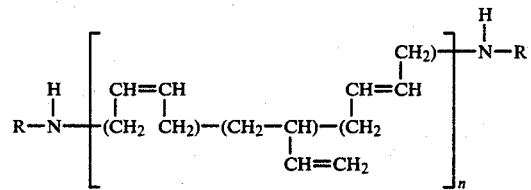

wherein R is hydrogen, a straight or branched chain alkyl group containing from 1 to 10 carbon atoms or a substituted or unsubstituted aryl or aralkyl group containing one or more benzenoid rings which may be fused or joined by single valency bonds, and n is an integer of from about 5 to 1500 and a process for the preparation thereof.

15 Claims, No Drawings

AMINE TERMINATED POLYBUTADIENE COMPOSITIONS AND PREPARATION THEREOF

BACKGROUND OF THE INVENTION

This application is related to a co-pending application in the names of Harry R. Hinney and Jamil Baghdadchi which is directed to and entitled Process For the Preparation of Amine Terminated Polybutadiene, as well as a co-pending application in the names of Harry R. Hinney and Jamil Baghdadchi entitled Alkane- or Arenesulfonate Terminated Polybutadiene Compositions and Preparation Thereof filed concurrently herewith, which applications disclose certain aspects of the present invention.

In the above co-pending application of Hinney and Baghdadchi, entitled Process for the Preparation of Amine Terminated Polybutadiene, which application is incorporated herein by reference, there is disclosed a two step process for the preparation of amine terminated poly butadiene compounds via a particular method for the preparation of an alkane or arenesulfonate ester of polyhydroxybutadiene (sulfonate terminated polybutadiene), employed in the present invention. The instant invention is directed to novel amine terminated polybutadiene compositions and to the method for the preparation of such compounds by reacting an alkane- or arenesulfonate ester with a primary amine or ammonia.

Diamino terminated compounds containing sulfur dispersed in the carbon-carbon chain are described in U.S. Pat. No. 3,388,107. U.S. Pat. No. 4,015,061 describes the preparation of N,N-bis (triakylsilyl) amino terminated polymers by treating a lithio-N,N-bis (trialkylsilyl) aryl amine with a diene monomer which are converted to a mono- or di-primary aryl amine-ended polymer. U.S. Pat. Nos. 4,070,344 and 4,151,222 describes the preparation of anionically polymerized monomers such as conjugated dienes which are end capped with polyisocyanates or polyisothiocyanates which are then reacted with amide containing compounds to give an imide type end group. The imide type terminated polymer is hydrolyzed to form an amine terminated polymer. U.S. Pat. No. 4,316,967 describes an amine terminated polymer connected to an epoxy polymer to form a copolymer.

The amine terminated polybutadienes of the present invention are easily produced in high yield with a minimum of any side product formation. The amine terminated polybutadienes can be reacted with isocyanates to give polyurea resins or with esters and epoxides to form polyamides and epoxy resins respectively. The amine terminated polybutadienes may also be reacted with various other polymer segments such as polyimides, polyureas, etc. to give block or graft copolymers.

Applicants are not aware of any truly pertinent prior art that is deemed to be anticipatory or suggestive of the novel amine terminated polybutadiene compounds of the instant invention or the preparation thereof by reacting an alkane- or arenesulfonate terminated polybutadiene with a primary amine or ammonia to produce a secondary or primary amine terminated polybutadiene respectively.

It is an object of this invention to provide a novel class of amine terminated polybutadiene compounds including a method for their preparation.

These and other objects and advantages of this invention will become apparent from the description of the invention which follows and from the claims.

SUMMARY OF THE INVENTION

The present invention relates to novel primary or secondary amine terminated polybutadiene compounds and a process for their preparation by reacting an alkane- or arenesulfonate terminated polybutadiene which may be prepared, for example, as described in the Hinney and Baghdadchi co-pending applications noted hereinabove, and incorporated herein by reference, with a primary amine or ammonia. Briefly a general postulated equation for the reaction system may be represented as follows:

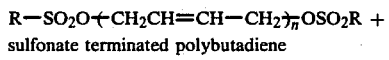
sulfonate terminated polybutadiene

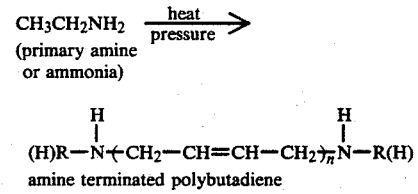

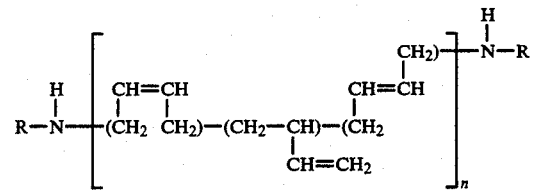
amine terminated polybutadiene

DETAILED DESCRIPTION OF THE INVENTION

In accordance with the present invention, novel amine terminated polybutadiene compounds having the formula

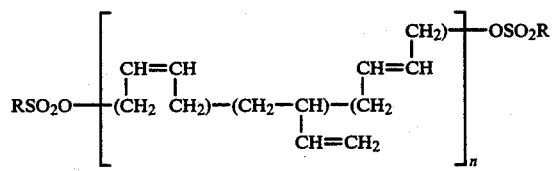

wherein R is hydrogen, a straight or branched chain alkyl group containing from 1 to 10 carbon atoms or a substituted or unsubstituted aryl or aralkyl group containing one or more benzenoid rings which may be fused or joined by single valency bonds and n is an integer of from about 5 to 1500, are prepared by reacting an alkane- or arenesulfonate terminated polybutdiene having the formula:

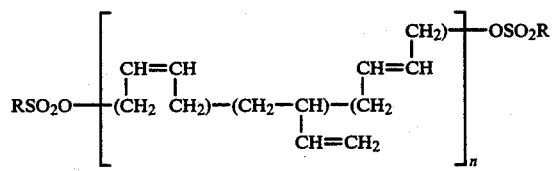

wherein R is an alkane group containing from 1 to 16 carbon atoms or a substituted or unsubstituted aryl group or aralkyl group containing one or more benzenoid rings which may be fused or joined by single valency bonds and n is an integer of from about 5 to 1500 at a temperature of from about 25° C. to 200° C., preferably from 50° C. to 110° C., with a primary amine to form a secondary amine terminated polybutadiene or with ammonia at an initial ammonia pressure which will provide a stoichiometric amount, and preferably an excess of ammonia, to form a primary amine terminated polybutadiene. Generally the ammonia pressure will range between about 200 psig and 500 psig. Optionally the process is carried out in the presence of an inert solvent.

The alkane- or arenesulfonate terminated polybutadiene compounds employed in the instant invention may be prepared, for example, as is set forth in the above noted co-pending applications of Hinney and Baghdadchi, incorporated herein by reference. The particular process involves reacting, at a temperature of from about 15° C. to 150° C., preferably between 25° C. and 50° C., optionally in the presence of an inert solvent, a polyhydroxybutadiene homopolymer with an alkane- or arenesulfonyl chloride or fluoride in the presence of a tertiary amine catalyst. Typical and preferred alkane- or arenesulfonate terminated polybutadiene compounds are the lower alkane compounds such as methane or ethane sulfonate terminated polybutadiene or paratoluene sulfonate terminated polybutadiene.

The primary amines which may be employed in the process of the present invention include, for example, ethyl amine, propylamines, allylamine, n-amylamine, butylamines, cyclohexylamine, n-tetradecylamine, benzylamine, aniline, toluidines, naphthylamine and the like. The preferred amines are the lower alkylamines such as n-butylamine or ethylamine.

The process of the present invention will proceed at temperatures of from about 25° C. to 200° C. but is preferably carried out at between 50° C. and 110° C.

Except when ammonia is employed as reactant to form a primary amine terminated polybutadiene, the process of the present invention is generally carried out at atmospheric pressure or the autogenous pressure of the reaction system, although higher pressures may be used and especially at the higher reaction temperatures or when the reaction temperature is above the boiling points of the solvent and or reactant. Subatmospheric pressure may be employed if desired.

Optionally solvents or mixtures of solvents which are stable and substantially chemically inert to the components of the reaction system at reaction temperatures may be employed in the reaction. Preferably the reactants will be soluble in the solvents employed at reaction temperatures in order to obtain a convenient rate of reaction. Suitable solvents which may be used in this invention include, for example, alkanes such as hexane, heptane, dimethylhexane, pentane, nonane, decane and the like, alkenes such as pentene, hexene, trimethylpentenes, hexadecene and the like, aromatic hydrocarbons such as benzene, xylene, toluene, ethylbenzene, cumene, diisopropylbenzenes, dibutylbenzenes, substituted benzenes, naphthalenes, and the like, ethers such as tetrahydrofuran, diphenyloxide, amides such as dimethylformamide, cycloaliphatic hydrocarbons such as cyclopentane, methyl cyclopentane, ethyl cyclopentane, cyclohexane, cycloheptane, cyclopentene, cyclohexene, cy- cloheptane, cyclopentene, cyclohexene, cyclooctene, and the like, sulfoxided such as dimethylsulfoxide, propylethylsulfoxide, sulfones such as sulfolane, diisopropyl sulfone, etc.

The reaction may be carried out in any suitable reactor which is generally equipped with means for agitation, means for regulating temperature and pressure if required. Although the order of addition of the reactants and solvents, if any, may vary, a general procedure for carrying out the reaction is to charge the alkane- or arenesulfonate terminated polybutadiene into the reaction vessel to which is then added a primary amine or ammonia and heated to the desired temperature and pressure with stirring to form an amine terminated polybutadiene. The reaction may be carried out batchwise or as a semicontinuous or continuous process. The reaction products are recovered and treated by any conventional method, such as distillation, evaporation or fractionation to effect separation from unreacted material, solvent, if any, and by products. The reaction time is generally dependent upon the reactants employed, solvent, temperature and pressure, but will generally run for from 4 to 8 hours under batch conditions.

The following examples are provided to illustrate the invention in accordance with the principles of this invention but are not to be construed as limiting the invention in any way except as indicated by the appended claims.

EXAMPLE 1

(Preparation of Methane Sulfonate Terminated Polybutadiene)

A 1000 ml three-necked reaction flask was fitted with a magnetic stirrer, an addition funnel, a condenser, and gas inlet and outlet tubes. The flask was flushed with dry nitrogen for 15 minutes. 100.16 g of polyhydroxybutadiene (ARCO Chemical Co. "Poly bd" R-45 HT) resin having a hydroxyl value of 0.80 meq/g.), 304.6 g of heptane and 17.01 g of tri-ethylamine was added to the reaction flask. To the stirred solution was added dropwise over a 15 minute period 19.27 g methanesulfonyl chloride. Stirring was continued for 3 hours at room temperature (22° C.–23° C.) to yield (99.6% as analyzed by InfraRed and NMR) a pale yellow methane sulfonate ester of polyhydroxybutadiene having a viscosity of 5700 cps. at 25° C.

EXAMPLE 2

111.8 g of the methane sulfonate terminated polybutadiene produce in Example 1 was added to a 1000 ml round bottom three neck reaction flask, equipped with a magnetic stirrer and condenser, along with 206 g heptane and 62.15 g of n-butylamine. The solution was refluxed at 98° C. for 10 hours. The resulting suspension was filtered and stripped of solvent to yield (92.5% as determined by Infrared (IR) and nuclear magnetic resonance (NMR)analysis) a secondary n-butylamine terminated polybutadiene having a viscosity of 7900 cps at 25° C.

EXAMPLE 3

To the reaction product mixture of a methane sulfonate terminated polybutadiene produced by reacting 200.31 g polyhydroxybutadiene and 19.24 g methanesulfonyl chloride in 302.9 g heptane with 17.06 g triethylamine catalyst, there was added 158.0 g cyclohexylamine and the mixture stirred at 98° C. for 6 hours. IR and NMR analysis showed a yield of yellow liquid cyclohexylamine terminated polybutadiene of 95.14% (205.8 g) having a viscosity of 7943 cps at 25° C.

EXAMPLE 4

To 49.06 g of paratoluene sulfonate terminated polybutadiene there was added 100 g toluene and 30.25 g n-butylamine. The mixture was reacted at 110° C. for 7 hours with stirring to produce, as determined by IR and NMR analysis, a 98.9% yield of n-butylamine terminated polybutadiene having a viscosity of 7850 cps at 25° C.

EXAMPLE 5

To the reaction product mixture of a methane sulfonate terminated polybutadiene produced by reacting 215.51 g polyhydroxybutadiene and 21.58 g methanesulfonyl chloride in 311.69 g heptane and with 18.50 g triethylamine catalyst, there was added 129.0 g tertiary butylamine and the mixture stirred at a temperature of 98° C. for 9.5 hours. IR and NMR analysis showed a 99.9% yield (224.9 g) of yellow viscous (8847 cps at 25° C.) t-butylamine terminated polybutadiene.

EXAMPLE 6

43 g of the methane sulfonate terminated polybutadiene prepared in Example 1 was dissolved in 45 g of dry heptane until a homogeneous solution was obtained. To this mixture, with vigorous stirring, there was added 34 g (a tenfold excess) of aniline dropwise during a 30 minute period. The mixture was heated to reflux of 98° C. for 12 hours and cooled. Filtration and evaporation of the solvent and excess aniline gave 40 g of red-brown aniline terminated polybutadiene having a viscosity of 6300 cps at 25° C. and an amine value of 0.39 meq/g.

EXAMPLE 7

50 g of the methane sulfonate terminated polybutadiene as prepared in Step 1 of Example 1 was dissolved in 150 g of xylene and placed in a 250 ml autoclave. 10 g of liquid ammonia initial pressure of 315 psig was introduced and the reactor which was sealed, stirred and heated to 50°-60° C. for 6.5 hours. After cooling the brown solution was filtered and the solvent evaporated to give 45 g or a 90% yield, as determined by IR and NMR analysis, of primary amine terminated polybutadiene having a viscosity 15,275 cps at 25° C. with an amine value of 1.22 meq/g.

EXAMPLE 8

100 g of methane sulfonate terminated polybutadiene as prepared in Step 1 of Example 1 was dissolved in 50 ml of heptane and placed in a 250 ml autoclave. 15 g of liquid ammonia with an initial pressure of 315 psig was added all at once and the reactor sealed, stirred and heated to 50° C. to 60° C. for 5 hours. The reactor was cooled and the contents drained and filtered and the solvent evaporated to give a viscous brown liquid 15,000 cps at 25° C. with an amine value of 1.27 meq/g.

EXAMPLE 9

302 g polyhydroxybutadiene (ARCO Chemical Co. "Poly bd" R-45 HT with an OH value of 0.84) with 28.88 g of triethylamine was added to a 1 liter three neck flask equipped with a mechanical stirrer, thermometer and dropping funnel. To this mixture there was added dropwise 31.49 g methanesulfonyl chloride during a 20 minute period. The exothermic temperature rose to 57°-60° C. and was stirred at this temperature and cooled to 40° C. during a 30 minute period. External heat was then provided to 75°-80° C. and the mixture stirred for 7 hours to give a methane sulfonate terminated polybutadiene. To this product mixture there was added 201.0 g (a tenfold excess) of n-butylamine all at once and the reaction mixture heated to 70° C. and stirred for 6 hours. After cooling the reaction mixture was filtered and the excess amine evaporated under reduced pressure to give 290.5 g of light brown n-butylamine terminated polybutadiene with a viscosity of 6987 cps at 25° C. with an amine value of 0.78 meq/g and a yield of over 95% based on the polyhydroxybutadiene.

EXAMPLE 10

The procedure of Example 9 was repeated using 200 g polyhydroxybutadiene (OH value of 0.84 meq/g) and 18.5 g triethylamine which were thoroughly mixed at 30° C. To this mixture there was added 20.0 g methanesulfonyl chloride dropwise during a 10 minute period and allowed to stir at 60° C. to 70° C. for 7 hours to give methane sulfonate terminated polybutadiene. To this sulfonate mixture 309 g of aniline was then added all at once and the mixture stirred at 60° C. to 70° C. for 10 hours. Work up of the product as in Example 9 gave 108 g of red viscous aniline terminated polybutadiene, viscosity 7643 cps at 25° C. with an amine value of 0.64 meq/g and a yield of 92.5% based on the polyhydroxybutadiene.

EXAMPLE 11

79.92 g of polyhydroxybutadiene (ARCO Chemical Co. "Poly bd" R-45 HT) along with 7.2 g triethylamine was added to a 250 ml three necked reaction flask equipped with a mechanical stirrer, thermometer and reflux condenser. To this mixture there was added 8.3 g (a 5% excess) of methanesulfonyl chloride during a 5 minute period. An exothermic reaction started raising the temperature to 70° C. The mixture was stirred at 60° C.-70° C. for 4 hours and then cooled to 50° C. To the methane sulfonate terminated polybutadiene mixture, produced above and maintained at 50° C., 71.09 g cyclohexylamine (a tenfold excess) was added all at once and the mixture stirred vigorously. The reaction mixture was then heated to 70° C. and stirred for 5 hours, cooled and filtered twice to give 71 g of brown cyclohexylamine terminated polybutadiene having a viscosity of 6850 cps at 25° C. with an amine value of 0.79 meq/g.

We claim:

1. A amine terminated polybutadiene compound having the formula

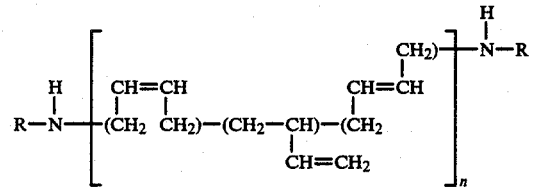

wherein R is hydrogen, a straight or branched chain alkyl group containing from 1 to 10 carbon atoms or a substituted or unsubstituted aryl or aralkyl group containing one or more benzenoid rings which may be fused or joined by single valency bonds and n is an integer of from about 5 to 1500.

2. An amine terminated polybutadiene according to claim 1 wherein R is tertiary butyl.

3. An amine terminated polybutadiene according to claim 1 wherein R is cyclohexyl.

4. An amine terminated polybutadiene according to claim 1 wherein R is an unsubstituted aryl group.

5. An amine terminated polybutadiene according to claim 1 wherein R is an n-butyl group.

6. A process for the preparation of an amine terminated polybutadiene having the formula:

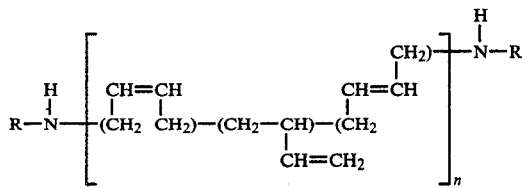

wherein R is hydrogen, a straight or branched chain alkyl group containing from 1 to 10 carbon atoms or a substituted or unsubstituted aryl or aralkyl group containing one or more benzenoid rings which may be fused or joined by single valency bonds, and n is an integer of from about 5 to 1500 which comprises reacting an alkane- or arenesulfonate terminated polybutadiene having the formula:

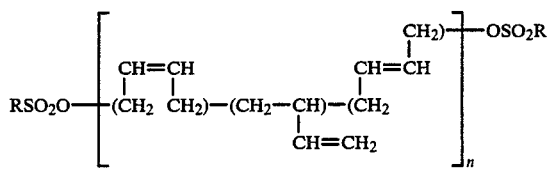

wherein R is an alkane group containing from 1 to 16 carbon atoms or a substituted or unsubstituted aryl group or aralkyl group containing one or more benzenoid rings which may be fused or joined by single valency bonds and n is an integer of from about 5 to 1500 at a temperature of from about 25° C. to 200° C. with a primary amine or ammonia at an ammonia pressure which will provide a stoichiometric amount in the reaction.

7. A process according to claim 6 wherein the primary amine is tertiary butylamine.

8. A process according to claim 6 wherein the primary amine is cyclohexylamine.

9. A process according to claim 6 wherein the primary amine is aniline.

10. A process according to claim 6 wherein the primary amine is n-butylamine.

11. A process according to claim 1 wherein the process is carried out at a temperature of from 50° C. to 110° C.

12. A process according to claim 1 wherein the ammonia pressure is between abut 200 psig and 500 psig.

13. A process according to claim 1 wherein the process is carried out in the presence of a solvent.

14. A process according to claim 13 wherein the solvent is heptane.

15. A process according to claim 13 wherein the solvent is toluene.

* * * * *